US010055304B2

United States Patent
Neef et al.

(10) Patent No.: US 10,055,304 B2
(45) Date of Patent: Aug. 21, 2018

(54) IN-MEMORY CONTINUOUS DATA PROTECTION

(71) Applicant: International Business Machines Corporation, Armonk, NY (US)

(72) Inventors: Alexander Neef, Boeblingen (DE); Martin Oberhofer, Boeblingen (DE); Andreas Trinks, Stuttgart (DE); Andreas Uhl, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 14/667,809

(22) Filed: Mar. 25, 2015

(65) Prior Publication Data

US 2015/0220405 A1 Aug. 6, 2015
US 2018/0052742 A9 Feb. 22, 2018

Related U.S. Application Data

(63) Continuation of application No. PCT/IB2013/056603, filed on Aug. 13, 2013.

(30) Foreign Application Priority Data

Oct. 24, 2012 (GB) .................................. 1219102.9

(51) Int. Cl.
*G06F 11/00* (2006.01)
*G06F 11/14* (2006.01)

(52) U.S. Cl.
CPC ...... *G06F 11/1458* (2013.01); *G06F 11/1415* (2013.01)

(58) Field of Classification Search
CPC ............. G06F 11/1458; G06F 11/1402; G06F 11/1438; G06F 11/1435; G06F 11/1446;
(Continued)

(56) References Cited

U.S. PATENT DOCUMENTS

| 5,574,874 A | 11/1996 | Jones et al. |
| 6,226,759 B1 | 5/2001 | Miller et al. |

(Continued)

FOREIGN PATENT DOCUMENTS

| JP | 05108388 A | 4/1993 |
| JP | 07271620 A | 10/1995 |

(Continued)

OTHER PUBLICATIONS

International Search Report, Mar. 20, 2013.
(Continued)

*Primary Examiner* — Joseph D Manoskey
(74) *Attorney, Agent, or Firm* — Garg Law Firm, PLLC; Rakesh Garg; Scott S. Dobson (57) ABSTRACT

An in-memory application has a state is associated with data ($C_{A0}$, $C_{B0}$, $C_{C0}$) stored in a memory and accessed by the application. A first restore point of the application is determined to represent a first time point (T0) in the execution time associated with a first state at which the application accesses the data being stored in memory locations ($C_{A0}$) using first addresses (S1) and first pointers (A0) which are stored in a first data structure. A first restore point identifier is assigned to the first restore point, whose value is indicative of (T0). The first restore point identifier is stored in association with (A0) and (S1) in a first entry of a second data structure. In the first data structure, the first addresses (S1) are associated to second pointers (A1) to contents of memory locations ($C_{A1}$) in the memory, and redirecting writing operations.

14 Claims, 3 Drawing Sheets

(58) Field of Classification Search
CPC .............. G06F 11/1448; G06F 11/1456; G06F 11/1469
USPC ..................... 714/15, 6.1, 19, 20, 47.1, 47.2
See application file for complete search history.

(56) References Cited

U.S. PATENT DOCUMENTS

| | | | | |
|---|---|---|---|---|
| 6,802,025 | B1* | 10/2004 | Thomas | G06F 8/65 711/133 |
| 7,293,134 | B1* | 11/2007 | Noland | G06F 11/1435 707/999.01 |
| 2006/0004860 | A1* | 1/2006 | Liedes | G06F 11/1471 |
| 2006/0230079 | A1 | 10/2006 | Strahl et al. | |
| 2010/0153626 | A1* | 6/2010 | Yano | G06F 11/1435 711/103 |
| 2011/0246425 | A1* | 10/2011 | Munoz | G06F 11/1458 707/640 |
| 2012/0109895 | A1 | 5/2012 | Zwilung et al. | |
| 2012/0136901 | A1* | 5/2012 | Raatikka | G06F 17/30368 707/797 |

FOREIGN PATENT DOCUMENTS

| | | |
|---|---|---|
| JP | 11024996 A | 1/1999 |
| JP | 2001188690 A | 7/2001 |
| WO | 2010116405 A1 | 10/2010 |

OTHER PUBLICATIONS

Wang et al; Checkpointing of Control Structures in Main Memory Database Systems, Proceedings of the 2004 International Conference on Dependable Systems and Networks.
International Search Report, Oct. 24, 2012.

* cited by examiner

IN-MEMORY CONTINUOUS DATA PROTECTION

FIELD OF THE INVENTION

The invention relates to computer systems, and more particularly to a method determining restore points of an in-memory application.

BACKGROUND

Application in-memory computing is on the rise in recent years due to the growth of RAM areas combined with continuously dropping prices making large RAM areas available. Enhancing existing applications in-memory may result in improved application performance and scalability.

SUMMARY OF THE INVENTION

It is an objective of embodiments of the invention to provide for an improved computer-implemented method for determining restore points of an in-memory application, a computer system and a computer-readable medium. Said objective is solved by the subject matter of the independent claims. Advantageous embodiments are described in the dependent claims.

In one aspect, the present invention relates to a computer implemented method providing at least one in-memory application in a computing system, wherein the at least one in-memory application has one or more states during its execution, at least one state of the one or more states is associated with data being stored in a memory of the computing system and being accessed by the at least one application.

The access by the at least one application may be a read and/or write access to the data. A state of the at least one application may be a state at runtime associated with the data in use by the at least one application.

For example, during the execution time of the at least one application, the content of the memory may change after a write access by the at least one application, and thus, the at least one application may have another state associated with the changed content of the memory. Every change may be associated with a restore point of the at least on application.

The method comprises determining a first restore point of the at least one application. Said first restore point represents a first time point in the execution time associated with a first state of the one or more states at which the at least one application accesses the data being stored in a first group of memory locations in the memory. The access is performed using first addresses and first pointers to contents of the first group of memory locations. The first addresses and first pointers are stored in a first data structure.

The access may be a write and/or read-modify-write access to the data being stored in the first group of memory locations in the memory. In parallel, the at least one application may have a read access only to other data stored in different locations than the first group of locations.

The first addresses may be for example logical addresses specified by the computing system and associated first pointers may be physical addresses to pages of the first group of memory locations.

The method further comprises assigning a first restore point identifier to the first restore point, wherein the first restore point identifier value is indicative of the first time point.

The first restore point identifier may be for example an entry index identifying the first entry of the second data structure.

The method further comprises storing the first restore point identifier in association with the first pointers and first addresses in a first entry of a second data structure of the computing system.

The method further comprises associating, in the first data structure, the first addresses to second pointers to contents of a second group of memory locations in the memory, thereby redirecting writing operations into the first group of memory locations to the second group of memory locations after the first restore point determination.

After the first time point, a first change in the memory content may happen. The second group of memory locations may contain this changed content.

These features may be advantageous as they may provide in-memory applications with continuous (i.e. continuous in time) in-memory data protection against changes in data stored in the memory and being accessed by the applications. The recovery of the at least one application to a previous state or restore point may be fast since the recovery procedure may be fully performed using only the memory. This is in contrast to conventional methods which require hard disk-based or even tape-based backup (with coarse-granular structure) restore procedures which are slow and require manual administrative intervention for restore steps.

According to one embodiment, the method further comprises receiving a selection of the first restore point, wherein the selection is indicative of the first restore point identifier; reading the first entry of the second data structure using the first restore point identifier; replacing the second pointers by the first pointers in the first data structure, by copying the first pointers from the second data structure into the entry of the first data structure containing the first addresses and removing the second pointers.

The selection of the first restore point may be performed by a user of the at least one application using restore parameters provided through a user interface which may be an interactive user interface associated with the at least one application. The restore parameters may be indicative of one or more metadata describing the first state of the at least one application.

This embodiment may be advantageous as it may provide a method for an efficient recovery to a restore point of the at least one application using the memory content only.

This embodiment is hereby described for one restore point but as those skilled in the art will easily understand that it may be generalized to a plurality of restore points.

The following embodiment may describe the case of a second restore point determination.

According to one embodiment, the method further comprises: determining a second restore point of the at least one application associated with a second state of the one or more states, said second restore point representing a second time point in the execution time associated with a second state of the one or more states at which the at least one application accesses the data being stored in a third group of memory locations in the memory, wherein the access is performed using second addresses and third pointers to contents of the third group of memory locations, the second addresses and third pointers being stored in the first data structure; assigning a second restore point identifier to the second restore point, wherein the second restore point identifier value is indicative of the second time point; storing the second restore point identifier in association with the third pointers and second addresses in a second entry of the second data structure; associating, in the first data structure, the second addresses to fourth pointers to contents of a fourth group of memory locations in the memory, thereby redirecting writing operations into the third group of memory locations to the fourth group of memory locations after the second restore point determination.

At the second time point a second change in the memory content may happen. The fourth group of memory locations may contain these second changes. The second state is a state associated with data in the memory before the second change may happen, e.g. associated with the first change that may happen after the first time point.

The reading comprises the steps of:
reading the second entry of the second data structure using the second restore point identifier; replacing the fourth pointers by the third pointers in the first data structure, by copying the third pointers from the second data structure into the entry of the first data structure containing the second addresses and removing the fourth pointers; reading the first entry of the second data structure using the first restore point identifier; and replacing the second pointers by the first pointers in the first data structure, by copying the first pointers from the second data structure into the entry of the first data structure containing the first addresses and removing the second pointers.

In other terms, the recovery of the first restore point may be performed incrementally by first undoing the second change and then the first change. This may be advantageous as it may provide an accurate method of restore point recovery.

According to one embodiment, the second data structure comprises in addition to the first restore point identifier one or more restore point identifiers associated with respective addresses and pointers to contents of one or more groups of memory locations in the memory. The method further comprises determining a maximal memory usage threshold value; in response to a determination that memory usage of the content of the first group and the one or more groups of memory locations is higher than the maximal memory usage threshold value, selecting a restore point identifier of the second data structure, deleting the selected restore point identifier and associated addresses and pointers.

According to one embodiment, the method further comprises: determining a maximal number of restore points; in response to a determination that the number of restore points identifiers stored in the second data structure is higher than the maximal number of restore points, selecting a restore point identifier of the second data structure; deleting the selected restore point identifier and associated addresses and pointers.

This may be advantageous as it may avoid exceeding the size of the memory content. Also, it may efficiently manage different applications running concurrently on the computing system and using the memory, by setting a maximal memory usage threshold value dependent on the application.

The deleting may be followed by removing contents of memory locations associated with the selected restore point identifier from the memory.

According to one embodiment, the second data structure comprises one or more restore point identifiers associated with respective addresses and pointers to one or more groups of memory locations in the memory, wherein the storing comprises: in response to a determination that no free memory locations are available in the memory to store the content of the second group of memory locations, selecting a restore point identifier of the one or more restore point identifiers, deleting the selected restore point identifier and associated addresses and pointers. In case the memory usage associated with the selected restore point is smaller than the memory usage of the second group of memory locations, selecting another restore point identifier of the one or more restore point identifiers to be deleted. This is repeated until the memory usage associated with the selected restore point is higher or equal to the memory usage of the second group of memory locations.

The term "memory usage" of a memory location as used herein refers to the amount of memory occupied by the memory location in the memory.

This may be advantageous as it may avoid the computer system congestion due to an overuse of the memory.

According to one embodiment, the selected restore point identifier corresponds to the oldest restore point.

The restore point associated with an oldest time point at which the restore point is created. This may be advantageous as it may keep the up to date states of the at least one application.

According to one embodiment, the deleting further comprises moving the content associated with the selected restore point into a storage capacity of the computing system, and associating, in the second data structure, the addresses of the selected restore point to pointers to the content of the storage capacity.

According to one embodiment, the storage capacity comprises a set of solid-state drive, SSD, devices, hard disk drives (HDDs) and floppy disks.

This may be advantageous as the recovery points are preserved and not lost for any further usage.

According to one embodiment, the method further comprises moving the addresses and pointers to the storage capacity.

This may be advantageous as it may further free up the memory of the computing system.

According to one embodiment, the second group of memory locations are free memory locations in the memory.

In another example, the second group of memory locations may be a group of memory locations being used by another application for which the computing system may give a low priority e.g. by suspending the other application.

According to one embodiment, the method further comprises in case the time elapsed after the first time point of the execution time is higher than a predetermined time threshold value deleting the first restore point identifier.

This may be advantageous, as the recovery points that reach a certain age are dropped and the associated space may be reused. The age at which the state of the at least one application is an outdated state that may not be of a user's interest.

According to one embodiment, the memory is a dynamic read only memory, DRAM.

According to one embodiment, said determining the restore point is performed using an application programming interface, API, to communicate with the at least one application.

In another aspect the invention relates to a computer-readable medium, comprising computer-readable program code embodied therewith which, when executed by a processor, cause the processor to execute a method according to anyone of the previous embodiments.

In another aspect, the invention relates to a computer system providing at least one in-memory application, wherein the at least one in-memory application has one or more states during its execution, at least one state of the one or more states is associated with data being stored in a memory of the computer system and being accessed by the at least one application, the computer system comprising:

a determining module for determining a first restore point of the at least one application, said first restore point representing a first time point in the execution time associated with a first state of the one or more states at which the at least one application accesses the data being stored in a first group of memory locations in the memory, wherein the access is performed using first addresses and first pointers to contents of the first group of memory locations, the first addresses and first pointers being stored in a first data structure;

an assigning module for assigning a first restore point identifier to the first restore point, wherein the first restore point identifier value is indicative of the first time point;

a storage module for storing the first restore point identifier in association with the first pointers and first addresses in a first entry of a second data structure of the computing system;

an association module for associating, in the first data structure, the first addresses to second pointers to contents of a second group of memory locations in the memory, thereby redirecting writing operations into the first group of memory locations to the second group of memory locations after the first restore point determination.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

BRIEF DESCRIPTION OF THE DRAWINGS

In the following, preferred embodiments of the invention will be described in greater detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

Figure 1:
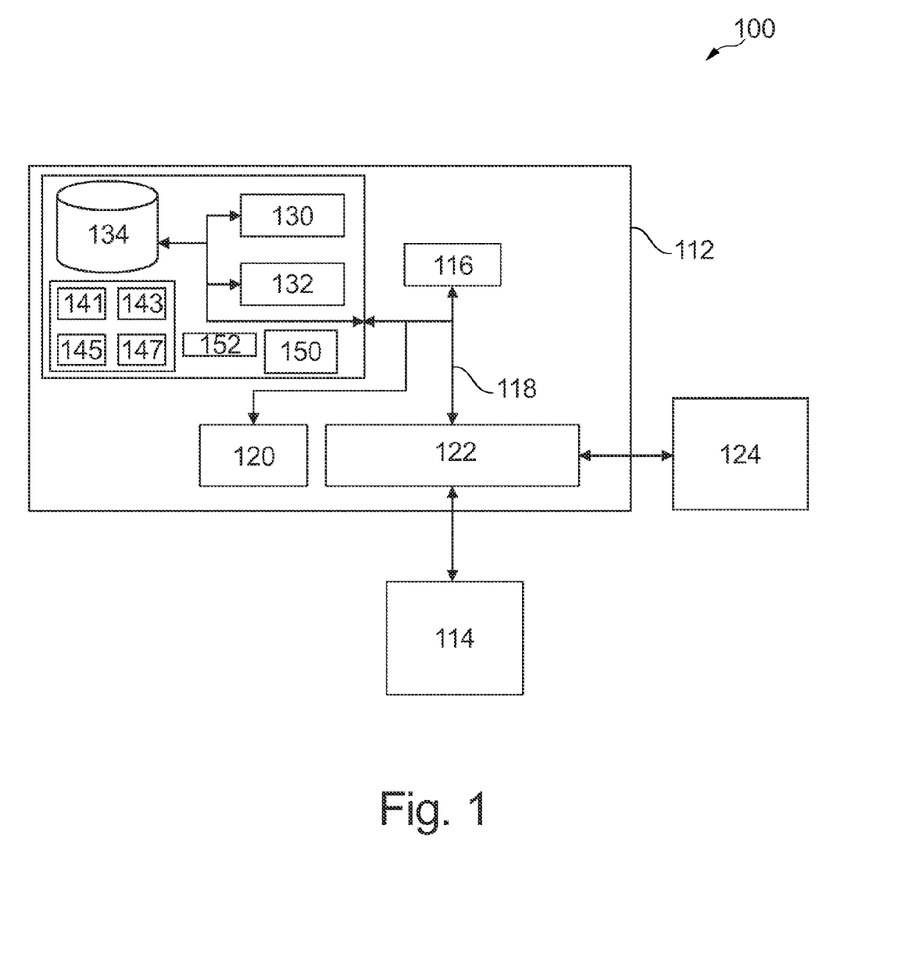
FIG. 1 illustrates system architecture for the execution of a method for determining restore points of an in-memory application.

FIG. 1 shows a schematic of an exemplary computing system. Computing system 100 is only one example of a suitable computing system and is not intended to suggest any limitation as to the scope of use or functionality of the invention described herein. For example, the computing system 100 may be part of a zEnterprise system of IBM®.

In Computing system 100 there is a computer system/ server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor based systems, set top boxes, programmable consumer electronics, network PCs, minicomputer systems, mainframe computer systems, and distributed Cloud computing environments that include any of the above systems or devices, and the like.

Computer system/server 112 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 112 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 112 in computing system 100 is shown in the form of a general-purpose computing device. The components of computer system/server 12 may include, but are not limited to, one or more processors or processing units 16, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 12, and it includes both volatile and non-volatile media, removable and non-removable media.

System memory 128 may include computer system readable media in the form of volatile memory, such as random access memory (RAM) and/or cache memory (not shown). Computer system/server 112 may further include other removable/non-removable, volatile/non-volatile computer system storage media. By way of example only, a storage system 134 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of the present subject matter.

Computer system/server 112 may also communicate with one or more external devices 14 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interface(s) 122. Still yet, computer system/server 12 can communicate with one or more networks such as a local area network (LAN), a general wide area network (WAN), and/or a public network (e.g., the Internet) via network adapter 120. As depicted, network adapter 20 communicates with the other components of computer system/server 112 via bus 118. It should be understood that although not shown, other hardware and/or software components could be used in conjunction with computer system/server 112. Examples include, but are not limited to: microcode, device drivers, redundant processing units, external disk drive arrays, RAID systems, tape drives, and data archival storage systems, etc.

System memory 128 is further shown as containing a first data structure 150 and a second data structure 152.

Program/utility 140 having a set (at least one) of program modules 141-147 may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 141-147 contain computer-executable code which enables the processor 116 to execute the steps 201-207 of FIG. 2.

Figure 2:
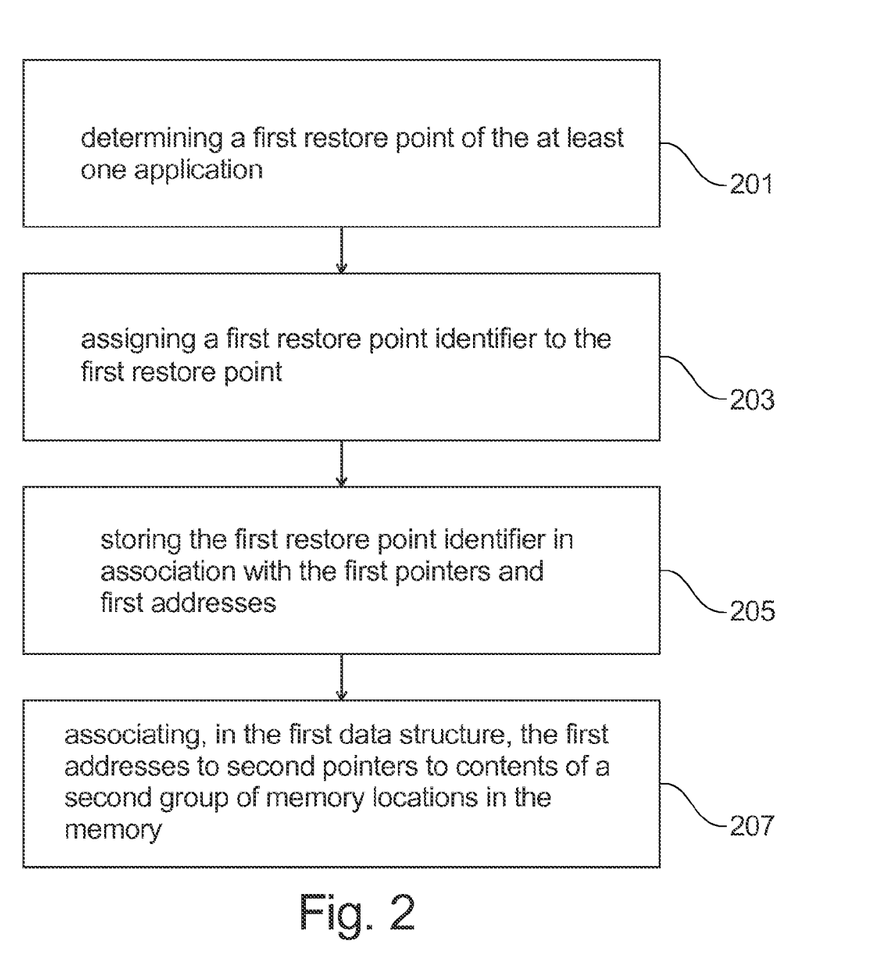
FIG. 2 is a flowchart of a method for determining restore points of an in-memory application.

FIG. 2 is a flowchart of a method providing at least one in-memory application in a computing system, wherein the at least one in-memory application has one or more states during its execution, at least one state of the one or more states is associated with data being stored in a memory of the computing system and being accessed by the at least one application.

In step 201, a first restore point of the at least one application is determined. Said first restore point represents a first time point in the execution time associated with a first state of the one or more states at which the at least one application accesses the data being stored in a first group of memory locations in the memory. The access is performed using first addresses and first pointers to contents of the first group of memory locations, the first addresses and first pointers being stored in a first data structure.

In step 203, a first restore point identifier is assigned to the first restore point. The first restore point identifier value is indicative of the first time point.

In step 205, the first restore point identifier is stored in association with the first pointers and first addresses in a first entry of a second data structure of the computing system.

In step 207, the first addresses are associated, in the first data structure, to second pointers to contents of a second group of memory locations in the memory. Thus, writing operations into the first group of memory locations are redirected to the second group of memory locations after the first restore point determination.

Figure 3:
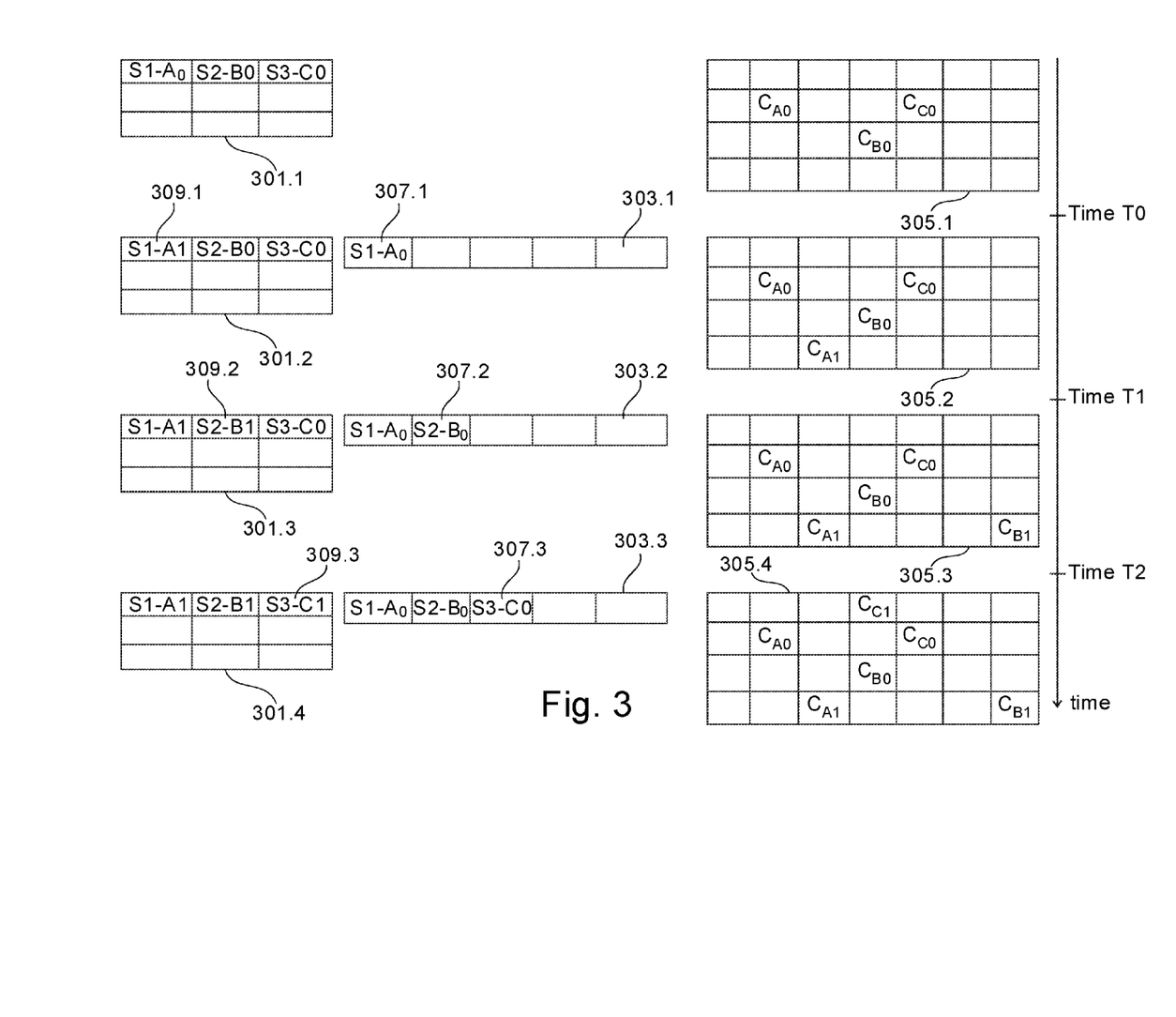
FIG. 3 is a diagram illustrating steps in formation and usage of recovery points of an in-memory application.

FIG. 3 is a diagram illustrating steps in formation of recovery points of an in-memory application accessing a memory of the computing system. The memory is organized in pages contained in a DRAM 305 and in maps 301 and 303 containing addresses/pointers to content of those pages. A "memory map" as used herein may associate for example logical addresses specified by the computing system 100 with pointers or physical addresses to pages in the DRAM.

The in-memory application accesses the DRAM using first memory map 301 (i.e. the first data structure). The DRAM is represented by a matrix of 7×4 pages 305. The first memory map 301 has for example 3×3=9 entries being accessed by the in-memory application. The number of entries in the first memory map 301 may be smaller than the number of pages in matrix 305, since additional free pages may be used by the application using the first memory map 301 and/or other applications or the Operating System (OS) itself. An entry of the first memory map 301 contains addresses S1, S2, S3 and associated respective pointers to pages of the DRAM A0, B0 and C0.

The in-memory application may be an in-memory database (solidDB, Vertica, SAP Hana, etc.) and/or an in-memory cache like WebSphere.

The application, at time T0, uses 3 pages $C_{A0}$, $C_{B0}$, $C_{C0}$ of the DRAM. The application accesses these three pages $C_{A0}$, $C_{B0}$, $C_{C0}$ through the first memory map 301 using addresses S1, S2 and S3 and respective pointers A0, B0 and C0 to content of the three pages $C_{A0}$, $C_{B0}$, $C_{C0}$. For example, the application uses address S1 and associated pointer A0 to access the content of the page $C_{A0}$ in DRAM 305. The application uses address S2 and associated pointer B0 to access the content of the page $C_{B0}$ in DRAM 305. The application uses address S3 and associated pointer C0 to access the content of the page $C_{C0}$ in DRAM 305.

As long as no recovery point is created, read and write operations may be done on those pages $C_{A0}$, $C_{B0}$, $C_{C0}$, and thus, the DRAM content of $C_{A0}$, $C_{B0}$, $C_{C0}$ may be overwritten at each write operation.

At time T0, a first restore or recovery point of the application may be created. The first restore point may be associated with a first restore point identifier that may be used to distinguish it from other restore points. At this time T0, the state of the application may be associated with data contained in pages $C_{A0}$, $C_{B0}$, $C_{C0}$. From that time T0 on, write operations on the pages $C_{A0}$, $C_{B0}$, $C_{C0}$ are redirected to new pages in the DRAM 305. For example, after time T0 the application may have write access to the content of the page $C_{A0}$. In order to avoid overwriting the content of $C_{A0}$ which is associated with the state of the application at the first recovery point, the write operation is redirected to the page $C_{A1}$. The page $C_{A1}$ may be a free page of the DRAM 305. This is done by associating, in the first memory map, the address S1 to the pointer A1 which points to content of the free page or memory location $C_{A1}$ in the DRAM. In addition, an entry 307.1 is created by storing the first restore point identifier (not shown) in association with the address S1 and pointer A0 (which points to the old content $C_{A0}$) in a first entry 307.1 of a second map 303.1 i.e. second data structure of the memory in order to recover the first restore point of the application. The first restore point identifier may be an entry index that identifies the first entry 307.1 of the second memory map 303.1.

At time T1, a second restore point of the application may be created. The change performed between T0 and T1 represents the state of the application at T1 i.e. at the second recovery point. The state of the application at time T1 may be associated with data contained in pages $C_{A1}$, $C_{B0}$, $C_{C0}$, because the page $C_{A0}$ has changed after T0 but the changes or write operation is redirected to $C_{A1}$ (i.e. the overwritten $C_{A0}$ content is in $C_{A1}$). $C_{B0}$ and $C_{C0}$ are untouched. From that time T1 on, write operations on the pages $C_{A1}$, $C_{B0}$, $C_{C0}$ are redirected to new pages in the DRAM 305. For example, after time T1 the application may have write access into the content of the page $C_{B0}$. To avoid overwriting the content of $C_{B0}$ which is associated with the state of the application at the second recovery point, the write operation is redirected to the page $C_{B1}$. The page $C_{B1}$ may be a free page of the DRAM 305. This is done by associating, in the first memory map, the address S2 to the pointer B1 which points to content of the free page $C_{B1}$ in the DRAM. In addition, an entry 307.2 is created by storing the second restore point identifier in association with the address S2 and pointer B0 (which points to the old content $C_{B0}$) in a second entry 307.2 of the second map 303.2 in order to recover the second restore point of the application. The second restore point identifier may be an entry index that identifies the second entry 307.2 of the second memory map 303.2.

At time T2, a third restore point of the application may be created. The change performed between T1 and T2 represents the state of the application at T2 i.e. at the third recovery point. The state of the application at time T2 may be associated with data contained in pages $C_{A1}$, $C_{B1}$, $C_{C0}$, because the page $C_{B0}$ has changed after T1 but the changes or write operation is redirected to $C_{B1}$. $C_{C0}$ is unchanged. From that time T2 on, write operations on the pages $C_{A1}$, $C_{B1}$, $C_{C0}$ are redirected to new pages in the DRAM 305. For example, after time T2 the application may have write access into the content of the page $C_{C0}$. To avoid overwriting the content of $C_{C0}$ which is associated with the state of the application at the third recovery point, the write operation is redirected to the page $C_{C1}$. The page CC1 may be a free page of the DRAM 305. This is done by associating, in the first memory map, the address S3 to the pointer C1 which points to content of the free page $C_{C1}$ in the DRAM. In addition, an entry 307.3 is created by storing the third restore point identifier in association with the address S3 and pointer C0 (which points to the old content $C_{C0}$) in a third entry CCC of the second map in order to recover the third restore point (and the first and second restore points) of the application. The third restore point identifier may be an entry index that identifies the third entry 307.3 of the second memory map.

In the interest of clarity and to avoid obscuring the description, the number of pages to which the application may have write access after time T0, T1 and T2 is one page. However, persons of ordinary skill in the art should appreciate that the application may have write access to more than one page.

Since keeping track of all recovery points may cause an excess in the size of the DRAM content after a certain amount of time. Thus, policies may be defined to manage the following expiration cases:

Expiration by number of recovery points. Once a certain number of recovery points is reached, the oldest recovery point is deleted when a new one is created.

Expiration by memory space used by recovery points. Once a certain amount of memory space is consumed by the space to track recovery points (i.e. second memory map content) and it's corresponding DRAM content, recovery points may be dropped when new ones are created.

Expiration by time. Once recovery points reach a certain age they are dropped and space can be reused.

The deleted recovery point is not lost as it may be migrated in to deeper storage levels as SSD or finally tape. This may be done, for example, by moving the content associated with the deleted restore point into a storage capacity of the computing system, and associating, in the second memory map, the first addresses to pointers to the content of the storage capacity. Also, the addresses and pointers associated with the deleted restore point may be moved to the storage capacity.

The restore points may be associated with restore parameters provided through an interactive user interface of the computing system. The restore parameters may be indicative of one or more metadata describing the first state of the at least one application.

To recover one of the restore points of the application, a customer of the application may select it using the interactive user interface. With that metadata, a customer is able to select a recovery point he wants to use. Once he starts the recovery, the tracked changes that were done after the recovery point creation will be reverted. Content that was not changed since the creation of the recovery point is not changed in the DRAM and still considered to be valid. With this method the DRAM can be recovered completely to the requested point in time.

For example, if the customer may restore the application to the third restore point, the method may use the content of the entry 307.3 associated with the third entry point identifier in the second memory map 303.3 to replace the pointer C1 of the entry 309.3 of the first memory map 301.4 by the pointer C0. This may be done by first copying the pointer C0 from the entry 307.3 of the second memory map 303.3 into the entry 309.3 of the first memory map 301.4 and the second pointer C1 is removed from the entry 309.3, such that the first memory map 301.4 has the same content as the first memory map 301.3. In this way the customer may recover the state of the application at time T2.

In case the customer may restore the application to the first restore point. That is, recovering the state of the application at time T0 (i.e. to the first restore point). In this case, a rollback or incremental recovery method may be used. For example, the third restore point is first recovered, followed by a recovery of the second restore point and then the recovery of the first restore point.

This may be done by first copying the pointer C0 from the entry 307.3 of the second memory map 303.3 into the entry 309.3 of the first memory map 301.4 and removing the pointer C1 from the entry 309.3, such that the first memory map 301.4 has the same content as the first memory map 301.3. Next, the pointer B0 is copied from the entry 307.2 of the second memory map 303.2 into the entry 309.2 of the first memory map 301.3 and the pointer B1 is removed from the entry 309.2, such that the first memory map 301.3 has the same content as the first memory map 301.2. Further, the pointer A0 is copied from the entry 307.1 of the second memory map 303.1 into the entry 309.1 in the first memory map 301.2 and the pointer A1 is removed from the entry 309.1, such that the first memory map 301.2 has the same content as the first memory map 301.1. Thus, the application may access the content of the DRAM 305.1 at time T0 using the first memory map 301.1 and thus recovered to the state of the application at T0.

LIST OF REFERENCE NUMERALS 100 computing system
112 server
114 external devices
116 processor
120 network adapter
122 I/O interface
124 display
128 memory
130 RAM
132 cache memory
134 storage system
140 utility
141 determining module
143 assigning module 145 storage module
147 association module
150 first data structure
152 second data structure
301 first memory map
303 second memory map
305 DRAM
307-309 entries.

The invention claimed is:

1. A computer implemented method comprising:
providing at least one in-memory application in a computing system, wherein the at least one in-memory application has one or more states during its execution, at least one state of the one or more states is associated with data (CA0, CB0, CC0) being stored in a memory of the computing system and being accessed by the at least one application;
determining a first restore point of the at least one application, said first restore point representing a first time point (T0) in the execution time associated with a first state of the one or more states at which the at least one application accesses the data being stored in a first group of memory locations (CA0) in the memory, wherein the access is performed using first addresses (S1) and first pointers (A0) to contents of the first group of memory locations, the first addresses and first pointers being stored in a first data structure;
assigning a first restore point identifier to the first restore point, wherein the first restore point identifier value is indicative of the first time point (T0);
storing the first restore point identifier in association with the first pointers (A0) and first addresses (S1) in a first entry of a second data structure of the computing system, wherein the second data structure comprises in addition to the first restore point identifier one or more restore point identifiers associated with respective addresses and pointers to contents of one or more groups of memory locations in the memory;
associating, in the first data structure, the first addresses (S1) to second pointers (A1) to contents of a second group of memory locations (CA1) in the memory, thereby redirecting writing operations into the first group of memory locations (CA0) to the second group of memory locations (CA1) after the first restore point determination;
determining a maximal memory usage threshold value;
selecting, in response to a determination that memory usage of the content of the first group and the one or more groups of memory locations is higher than the maximal memory usage threshold value, a restore point identifier of the second data structure; and
deleting the selected restore point identifier and associated addresses and pointers.

2. The method according to claim 1, further comprising:
receiving a selection of the first restore point, wherein the selection is indicative of the first restore point identifier;
reading the first entry of the second data structure using the first restore point identifier; and
replacing the second pointers (A1) by the first pointers (A0) in the first data structure, by copying the first pointers (A0) from the second data structure into the entry of the first data structure containing the first addresses (S1) and removing the second pointers (A1).

3. The method according to claim 2, further comprising:
determining a second restore point of the at least one application associated with a second state of the one or more states, said second restore point representing a second time point (T1) in the execution time associated with a second state of the one or more states at which the at least one application accesses the data being stored in a third group of memory locations (CB0) in the memory, wherein the access is performed using second addresses (S2) and third pointers (B0) to contents of the third group of memory locations (CB0), the second addresses (S2) and third pointers (B0) being stored in the first data structure;
assigning a second restore point identifier to the second restore point, wherein the second restore point identifier value is indicative of the second time point;
storing the second restore point identifier in association with the third pointers (B0) and second addresses (S2) in a second entry of the second data structure; and
associating, in the first data structure, the second addresses (S2) to fourth pointers (B1) to contents of a fourth group of memory locations (CB1) in the memory, thereby redirecting writing operations into the third group of memory locations (CB0) to the fourth group of memory locations (CB1) after the second restore point determination,
wherein the reading comprises the steps of:
reading the second entry of the second data structure using the second restore point identifier;
replacing the fourth pointers (B1) by the third pointers (B0) in the first data structure, by copying the third pointers (B0) from the second data structure into the entry of the first data structure containing the second addresses (S2) and removing the fourth pointers (B1);
reading the first entry of the second data structure using the first restore point identifier; and
replacing the second pointers (A1) by the first pointers (A0) in the first data structure, by copying the first pointers (A0) from the second data structure into the entry of the first data structure containing the first addresses (S1) and removing the second pointers (A1).

4. The method according to claim 1, wherein the second data structure comprises one or more restore point identifiers associated with respective addresses and pointers to one or more groups of memory locations in the memory, wherein the storing comprises:
selecting, in response to a determination that no free memory locations are available in the memory to store the content of the second group of memory locations, a restore point identifier of the one or more restore point identifiers;
deleting the selected restore point identifier and associated addresses and pointers,
selecting, in case the memory usage associated with the selected restore point is smaller than the memory usage of the second group of memory locations, another restore point identifier of the one or more restore point identifiers to be deleted; and
repeating the last selecting step until the memory usage associated with the selected restore point is higher or equal to the memory usage of the second group of memory locations.

5. The method according to claim 1, wherein the second data structure comprises in addition to the first restore point identifier one or more restore point identifiers associated with respective addresses and pointers to contents of one or more groups of memory locations in the memory, the method further comprising:

determining a maximal number of restore points;

selecting, in response to a determination that the number of restore points identifiers stored in the second data structure is higher than the maximal number of restore points, a restore point identifier of the second data structure; and deleting the selected restore point identifier and associated addresses and pointers.

6. The method according to claim 1, wherein the selected restore point identifier corresponds to the oldest restore point.

7. The method according to claim 1, further comprising:

deleting, in case the time elapsed after the first time point of the execution time is higher than a predetermined time threshold value, the first restore point identifier.

8. The method according to claim 1, wherein the deleting further comprises:

moving the content associated with the selected restore point into a storage capacity of the computing system; and associating, in the second data structure, the addresses of the selected restore point to pointers to the content of the storage capacity.

9. The method of claim 8, further comprising:

moving the addresses and pointers to the storage capacity.

10. The method according to any of the previous claims, wherein the second group of memory locations are free memory locations in the memory.

11. The method according to claim 1, wherein the memory is a dynamic read only memory, DRAM.

12. The method according to claim 1, wherein said determining the restore point is performed using an application programming interface, API, to communicate with the at least one application.

13. A non-transitory computer-readable medium, comprising computer-readable program code embodied therewith which, when executed by a processor, cause the processor to execute a method according to claim 1.

14. A computer system comprising a processor, a memory, a non-transitory computer-readable storage medium, and program instructions stored on the computer-readable storage medium for execution by the processor via the memory, the stored program instructions comprising:

a providing module for providing at least one in-memory application, wherein the at least one in-memory application has one or more states during its execution, at least one state of the one or more states is associated with data (CA0, CB0, CC0) being stored in a memory of the computer system and being accessed by the at least one application;

a determining module for determining a first restore point of the at least one application, said first restore point representing a first time point (T0) in the execution time associated with a first state of the one or more states at which the at least one application accesses the data being stored in a first group of memory locations (CA0) in the memory, wherein the access is performed using first addresses (S1) and first pointers (A0) to contents of the first group of memory locations (CA0), the first addresses (S1) and first pointers (A0) being stored in a first data structure;

an assigning module for assigning a first restore point identifier to the first restore point, wherein the first restore point identifier value is indicative of the first time point (T0);

a storage module for storing the first restore point identifier in association with the first pointers (A0) and first addresses (S1) in a first entry of a second data structure of the computing system, wherein the second data structure comprises in addition to the first restore point identifier one or more restore point identifiers associated with respective addresses and pointers to contents of one or more groups of memory locations in the memory;

an association module for associating, in the first data structure, the first addresses (S1) to second pointers (A1) to contents of a second group of memory locations (CA1) in the memory, thereby redirecting writing operations into the first group of memory locations (CA0) to the second group of memory locations (CA1) after the first restore point determination;

a determination module for determining a maximal memory usage threshold value;

a selection module for selecting, in response to a determination that memory usage of the content of the first group and the one or more groups of memory locations is higher than the maximal memory usage threshold value, a restore point identifier of the second data structure; and a deletion module for deleting the selected restore point identifier and associated addresses and pointers.

* * * * *